US008325160B2

(12) United States Patent
St. Pierre et al.

(10) Patent No.: US 8,325,160 B2
(45) Date of Patent: Dec. 4, 2012

(54) CONTACT SENSITIVE DEVICE FOR DETECTING TEMPORALLY OVERLAPPING TRACES

(75) Inventors: Richard L. St. Pierre, North Andover, MA (US); Damir Suljic, Nashua, NH (US)

(73) Assignee: 3M Innovative Properties Company, Saint Paul, MN (US)

( * ) Notice: Subject to any disclaimer, the term of this patent is extended or adjusted under 35 U.S.C. 154(b) by 275 days.

(21) Appl. No.: 12/558,096

(22) Filed: Sep. 11, 2009

(65) Prior Publication Data

US 2011/0063228 A1 Mar. 17, 2011

(51) Int. Cl.
*G06F 3/043* (2006.01)

(52) U.S. Cl. ........ 345/177; 345/173; 345/174; 345/176; 178/18.01; 178/18.03; 178/18.04

(58) Field of Classification Search .................. None
See application file for complete search history.

(56) References Cited

U.S. PATENT DOCUMENTS

| | | | | |
|---|---|---|---|---|
| 5,097,415 A * | 3/1992 | Yoshimura et al. | ........ | 178/18.04 |
| 5,491,305 A * | 2/1996 | Kawakami et al. | ........ | 178/18.04 |
| 5,637,839 A * | 6/1997 | Yamaguchi et al. | ....... | 178/18.04 |
| 5,691,959 A * | 11/1997 | Kriewall et al. | .............. | 367/129 |
| 6,628,270 B2 * | 9/2003 | Sekiguchi et al. | ............ | 345/173 |
| 6,723,929 B2 * | 4/2004 | Kent | .......................... | 178/18.04 |
| 6,871,149 B2 * | 3/2005 | Sullivan et al. | ................. | 702/56 |
| 6,922,642 B2 | 7/2005 | Sullivan | | |
| 7,157,649 B2 | 1/2007 | Hill | | |
| 7,176,902 B2 * | 2/2007 | Peterson et al. | .............. | 345/173 |
| 7,184,898 B2 | 2/2007 | Sullivan et al. | | |
| 7,315,300 B2 * | 1/2008 | Hill et al. | ....................... | 345/173 |
| 7,411,584 B2 * | 8/2008 | Hill et al. | ....................... | 345/177 |
| 7,499,039 B2 * | 3/2009 | Roberts | ......................... | 345/177 |
| 7,643,015 B2 * | 1/2010 | Paradiso et al. | ................ | 345/177 |
| 7,668,340 B2 * | 2/2010 | Cohen et al. | .................. | 382/103 |
| 7,683,890 B2 * | 3/2010 | Geaghan | ........................ | 345/173 |
| 8,077,159 B2 * | 12/2011 | St. Pierre | ....................... | 345/173 |
| 2001/0006006 A1 * | 7/2001 | Hill | ................................ | 73/606 |
| 2002/0135570 A1 * | 9/2002 | Iisaka et al. | .................... | 345/177 |
| 2003/0063073 A1 * | 4/2003 | Geaghan et al. | .............. | 345/173 |
| 2004/0160421 A1 * | 8/2004 | Sullivan | ........................ | 345/173 |
| 2005/0134574 A1 | 6/2005 | Hill | | |
| 2005/0146511 A1 | 7/2005 | Hill et al. | | |
| 2005/0146512 A1 * | 7/2005 | Hill et al. | ....................... | 345/173 |
| 2005/0165564 A1 * | 7/2005 | Sullivan et al. | .................. | 702/56 |
| 2005/0259378 A1 | 11/2005 | Hill et al. | | |
| 2006/0238521 A1 * | 10/2006 | Westerman et al. | .......... | 345/173 |
| 2006/0244732 A1 | 11/2006 | Geaghan | | |
| 2007/0109279 A1 * | 5/2007 | Sigona | ........................... | 345/177 |
| 2007/0257890 A1 | 11/2007 | Hotelling et al. | | |
| 2010/0013783 A1 | 1/2010 | St. Pierre | | |
| 2011/0037727 A1 * | 2/2011 | Lee et al. | ....................... | 345/174 |

FOREIGN PATENT DOCUMENTS

| | | |
|---|---|---|
| KR | 10-2009-0017557 | 2/2009 |
| WO | WO 2005/116813 A2 | 12/2005 |

OTHER PUBLICATIONS

Kalman, R. E.; "A New Approach to Linear Filtering and Prediction Problems", Transactions of the ASME—Journal of Basic Engineering, 82(D), pp. 35-45, 1960.

(Continued)

*Primary Examiner* — Dismery Mercedes

(74) *Attorney, Agent, or Firm* — Steven A. Bern

(57) ABSTRACT

Systems and methods for detecting temporally overlapping trace events on a touch sensitive device.

29 Claims, 4 Drawing Sheets

OTHER PUBLICATIONS

Welch, G. and Bishop, G.; "An Introduction to the Kalman Filter", SIGGRAPH 2001, Course 8, pp. 1-16, Updated: Monday, Jul. 24, 2006, available at: http://www.cs.unc.edu/~weich/kalman.

International Search Report Form PCT/ISA/210, PCT/US2010/047616, International Filing Date: Sep. 2, 2010, 3 pages.

* cited by examiner

CONTACT SENSITIVE DEVICE FOR DETECTING TEMPORALLY OVERLAPPING TRACES

BACKGROUND

A touch sensitive device offers a simple, intuitive interface to a computer or other data processing device. Rather than using a keyboard to type in data, a user can transfer information by touching an icon or by writing or drawing on a touch sensitive panel. Touch panels are used in a variety of information processing applications. Interactive visual displays often include some form of touch sensitive panel. Integrating touch sensitive panels with visual displays is becoming more common with the emergence of next generation portable multimedia devices such as cell phones, personal data assistants (PDAs), and handheld or laptop computers. It is now common to see electronic displays with touch sensitive panels in a wide variety of applications, such as teller machines, gaming machines, automotive navigation systems, restaurant management systems, grocery store checkout lines, gas pumps, information kiosks, and hand-held data organizers, to name a few. Some of these touch sensitive panels support the resolution of multiple simultaneous (or temporally overlapping) touches.

Some touch-sensing technologies are better suited for resolving temporally overlapping traces than others. For example, many analog-type touch sensors comprised of a single layer of a conductive coating (such as indium tin oxide, or ITO) cannot resolve the coordinates of two fingers simultaneously placed on a touch pad. If two fingers are placed, the controller will determine a touch event to be in the middle of the touch points, weighted by the capacitive coupling associated with either touch point (i.e., if a palm and a finger touch on separate ends of an analog touch sensor, the touch will be reported closer to the palm than the finger). Some have used clever software to approximate multi-touch in such an environment, which may be acceptable for resolving certain gestures (such as a pinch gesture), but the precise coordinates of multiple touches using such an approach cannot be known, and is subject to a large number of assumptions (like only two fingers, and not three, will be used on a device). Matrix-type capacitive touch sensors are particularly suited for multi-touch because, in some configurations, they can interrogate individual nodes on the touch screen for the presence of a touch. Similarly, camera-based touch sensors are well-suited for resolving multiple touches or traces.

3M Touch Systems markets and sells Dispersive Signal Technology ("DST") touch systems that use bending-wave type touch technology to determine the location of a touch, or resolve the coordinates of a single trace, made upon a surface of a substrate. Such DST touch systems have been sold in the United States earlier than one year prior to the filing of this application for patent. In general, bending wave touch technology senses vibrations created by a touch in the bulk material of the touch sensitive substrate. These vibrations are denoted bending waves and may be detected using sensors typically placed on the edges of the substrate. Signals generated by the sensors are analyzed to determine the touch location. DST touch systems include sensors that are typically constructed of chemically strengthened rectangular glass (sized to be overlaid on an electronic display), with a piezoelectric transducer at each corner. The piezoelectric transducers produce voltages indicative of bending waves propagating through the glass as a result of a contact made with the glass, or a drag made with a finger (or other object) across the surface of the glass. A controller coupled to the piezoelectric transducers analyzes the signals received at the respective piezoelectric transducers and determines coordinates of a single impact, or the coordinates of a single trace event, which the controller would then provide to, for example, a computer. The method used by these touch sensors to resolve a single trace event is shown in reference to FIG. 1. Touch sensors (300) provide a data stream of signals (305) indicative of bending waves propagating through a substrate. This data stream is provided to a dispersive signal processing module (310), which carries out the following procedures:

1. Input signals from sensors (assume 4 sensors for this example) are filtered and transformed to the frequency domain via a Fast Fourier Transform (FFT).
2. The FFT-transformed signals are then normalized and combined in pairs using a form of generalized cross-correlation. This process removes common noise and delays from the signal, making it easier to determine a touch location. In one embodiment there are six cross-correlation functions calculated (one between each pair of sensors).
3. These six functions are then transformed from the frequency domain to the wavenumber domain using a dispersion correction function that accounts for the dispersive nature of bending waves in plate-type substrates. As described in U.S. Pat. No. 6,922,642, this dispersion correction function uses a substrate constant C, defined by $C=(\mu/B)1/4$, where $\mu$=mass per unit area of the substrate, and B=bending stiffness of the substrate. Removing the dispersive effects allows for the calculation of the distance difference between the touch point and the two sensors used in the cross-correlation.
4. These six functions are then transformed to the spatial domain via an inverse-FFT.
5. The peaks of each function define potential distance differences from the touch point to the two sensors for each cross-correlation. These distance differences define a hyperbolae containing potential touch points (solutions). Intersections of the hyperbolae from the various cross-correlation functions define possible touch points. The possible touch points (solutions) are in the form of coordinates $(x_i, y_i)$, and are scored based on their similarity to other solutions determined from other cross correlation functions.

A single top ranked solution (306), if its score exceeds a threshold value, is then provided to a Kalman filter module (320). The Kalman filter module determines if the solution is within a pre-defined distance from the next coordinate predicted by the Kalman filter. It also determines if the "roughness" of the predicted point exceeds a threshold (and if so, discards it). Roughness is a measure of how likely the data point matches the Kalman filter and is defined as:

$$r = \frac{d_{i,j}}{S}$$

where S is the statistical covariance of d. Thus when the Kalman filter analysis suggests uncertainty (covariance is high) more variation in solutions will be tolerated. Alternatively, when the Kalman filter is tracking a good signal (covariance is low) it is much more selective about what points it accepts. This process repeats, thus producing a stream of coordinates (307) that comprise the trace. This stream may be provided by a controller to a computer.

In the DST touch systems sold by 3M Touch Systems, this process works acceptably for resolving single traces. However, DST touch systems cannot resolve coordinates associated with a plurality of temporally overlapping trace events; that is, they cannot properly determine the locations of two objects being dragged across the surface of the touch sensor at the same time.

SUMMARY

Systems and methods for detecting temporally overlapping traces on a touch sensor employing bending wave—type touch sensing technology. Traces could result from, for example, dragging two fingers or other objects drag across a touch screen at the same time or in a temporally overlapping manner. The coordinates that comprise the trace event are computed and provided, for example, to a computer or other device. In one embodiment this information is used to allow a user to interact with a graphical user interface provided by a computer.

In one embodiment, a touch sensitive device is described, comprising a substrate capable of supporting bending waves having a first surface, a portion of the first surface defining a touch sensitive area; a plurality of sensors coupled to the touch sensitive surface and configured to sense bending waves propagating through the substrate and provide electronic signals representative of the bending waves; and electronics or a controller communicatively coupled to the plurality of sensors and configured to receive electronic signals from the sensors and based on these signals, calculate constituent coordinates of at least first and second traces made by at least a first and second objects dragged across portions of the touch sensitive area in a temporally overlapping manner.

In another embodiment, a method for resolving constituent coordinates of a plurality of traces (n) made by dragging objects across the touch sensitive surface of a touch sensitive device in a temporally overlapping manner, comprising receiving from the sensors bending wave information indicative of bending of the substrate in response to n temporally overlapping trace events; calculating from the bending wave information candidate coordinates representative of the coordinates of trace objects at points in time during the plurality of traces; and associating the candidate coordinates with a particular one of the n traces.

DETAILED DESCRIPTION

Figure 1:
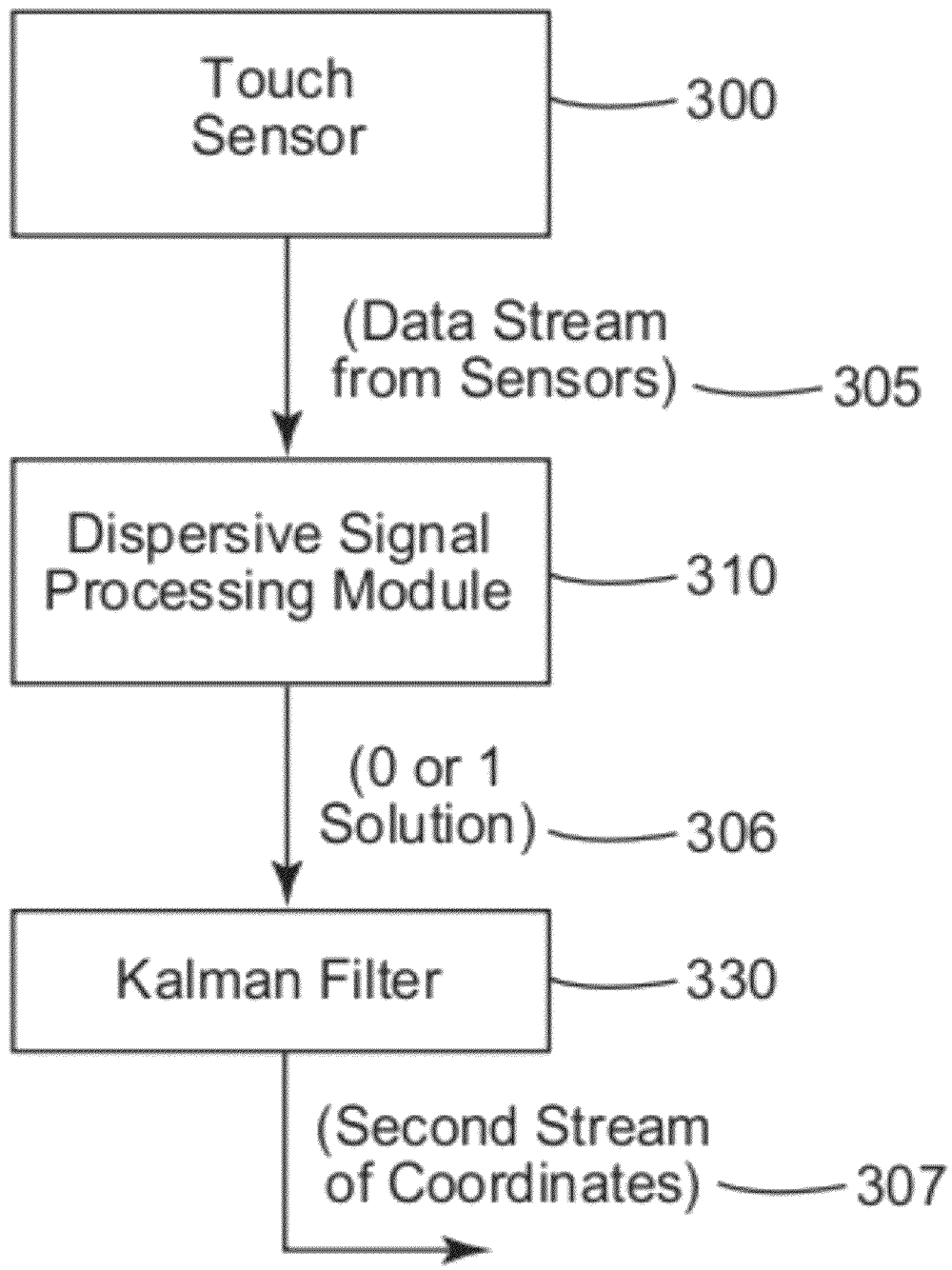
FIG. 1 is a schematic block diagram of a process used to determine coordinates of a single trace.

The present invention now will be described more fully hereinafter with reference to the accompanying drawings, certain of which show embodiments of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

This disclosure concerns using bending-wave type touch technology to resolve multiple temporally overlapping trace events as would occur, for example, if a person dragged a finger on each hand across a touch sensor at the same time. The term bending wave vibration refers to an excitation, for example by a physical contact, which imparts some out of plane displacement to a member capable to supporting bending wave vibrations. Many materials bend, some with pure bending with a perfect square root dispersion relation and some with a mixture of pure and shear bending. The dispersion relation describes the dependence of the in-plane velocity of the waves on the frequency of the waves. The term bending may also apply to out of plane displacement or deflection of a member when subject to loading, such as when a touch panel deflects (for example, is subject to bowing) in response to a touch applied to the surface of the touch panel. In this regard, one surface of the touch panel is placed in compression, while the opposing surface is placed in tension, which results in bowing of the touch panel. Such bowing of the touch panel may be detected using bending mode sensors of a type described herein and in a manner discussed below.

Though, as mentioned above, 3M's DST touch sensors are able to resolve a single trace, resolving multiple simultaneous traces is much more difficult because neither trace produces a distinct signal (that is, a signal received at a piezoelectric transducer from one trace event is indistinguishable from that received from another one), and the signals propagating from either of the traces can interfere with the other one. Further, the bending wave signals emanating from somebody making a dragging motion with his finger are relatively weak and susceptible to noise contamination.

The present invention relates to touch activated, user interactive devices and methods that provide for sensing of temporally overlapping trace-induced vibrations that propagate through a substrate for sensing by a number of transducers. More particularly, the present invention relates to touch sensing devices and methods that employ transducers configured to sense bending wave vibrations that propagate through a substrate, from which touch location information may be determined using disparate touch location detection techniques. Such touch sensing devices, associated algorithms, and techniques used to resolve data from the transducers into a touch location on the substrate are described in U.S. Pat. No. 7,157,649 "Contact Sensitive Device" (Hill); U.S. Pat. No. 6,871,149 "Contact Sensitive Device" (Sullivan et. al.); U.S. Pat. No. 6,922,642 "Contact Sensitive Device" (Sullivan); U.S. Pat. No. 7,184,898 "Contact Sensitive Device" (Sullivan et. al.); and in US Patent Application Publication No. 2006/0244,732, "Touch Location Determination using Bending Mode Sensors and Multiple Detection Techniques" (Geaghan), the contents of each of which is hereby incorporated by reference in its entirety. These patents disclose, for example, the dispersion correction and the signal processing steps necessary to calculate a touch coordinate from measured bending wave data.

Figure 2:
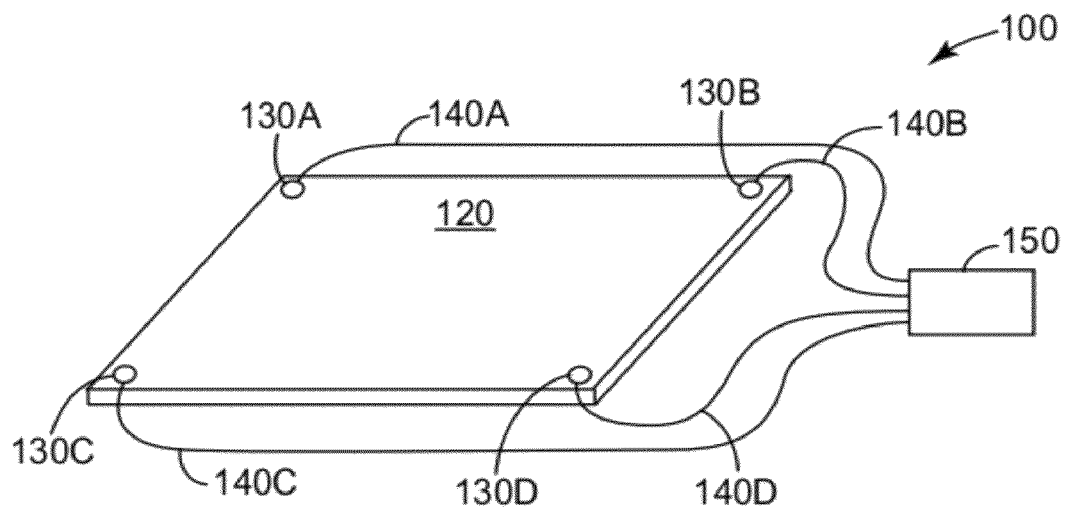
FIG. 2 is a drawing of a touch sensitive device incorporating features and functionality for detecting bending wave vibrations.

Turning now to FIG. 2, there is illustrated one configuration of a touch sensitive device 100 that incorporates features and functionality for detecting bending wave vibrations and determining constituent coordinates of simultaneous traces using a multiplicity of disparate touch location detection techniques. According to this embodiment, the touch sensitive device 100 includes a substrate 120 and vibration sensors 130 which are in turn coupled to an upper surface of the substrate 120. In this illustrative example, the upper surface of the substrate 120 defines a touch sensitive surface. Although vibration sensors 130 are shown coupled to the upper surface of the substrate 120, they can alternatively be coupled to the lower surface of the substrate 120. In another embodiment, one or more vibration sensors 130 may be coupled to the upper surface while one or more other vibration sensors 130 may be coupled to the lower surface of the touch substrate 120. The vibration sensors 130 can be coupled to touch substrate 120 by any suitable means, for example using an adhesive or other suitable material, so long as the mechanical coupling achieved is sufficient for vibrations propagating in the touch plate to be detected by the vibration sensors. Exemplary vibration sensors 130 and vibration sensor arrangements are disclosed in, for example, co-assigned U.S. Patent Application Publication No. 2005/0134574, which is fully incorporated herein by reference into this document.

Substrate 120 may be any substrate that supports vibrations of interest, such as bending wave vibrations. Exemplary substrates 120 include plastics such as acrylics or polycarbonates, glass, steel, aluminum, or other suitable materials. In general, any material whose dispersion relation is known could be used. Touch substrate 120 can be transparent or opaque, and can optionally include or incorporate other layers or support additional functionalities. For example, substrate 120 can provide scratch resistance, smudge resistance, glare reduction, anti-reflection properties, light control for directionality or privacy, filtering, polarization, optical compensation, frictional texturing, coloration, graphical images, and the like. In one embodiment, substrate 120 is a rectangular piece of glass. In another embodiment, substrate 120 is a sheet-type substrate in that it is thin relative to its length and width. In some embodiments, substrate 120 is of relatively uniform thickness. Substrate 120 may be very large, in sizes well exceeding 46" in the diagonal. For example, substrate 120 may be 50", 60", 70", 80", 90" or even 100" in the diagonal. Even larger sizes are conceivable, limited only by the size where vibrations become too small to be detected by the sensors.

Substrate 120 may be already incorporated into some other application not necessarily intended for use as a touch-sensitive device. For example, the sensor boards could be affixed to the glass on a window.

In some embodiments, substrate 120 includes conductive traces running near its edges to reduce the profile of electrical connectors 140. In general, the touch sensitive device 100 includes at least three vibration sensors 130 to determine the position of a touch input in two dimensions, and four vibration sensors 130 (shown as vibration sensors 130A, 130B, 130C, and 130D in FIG. 2) may be desirable in some embodiments, as discussed in U.S. Pat. No. 6,922,642 (Sullivan) and U.S. Pat. No. 7,157,649 (Hill).

In one embodiment, all of the sensors 130 are configured to sense vibrations in the touch substrate 120. The sensors 130 may be substantially the same in terms of technology and functionality. For example, all of the sensors 130 may be bending mode sensors produced by a particular manufacturer under the same part number or identification. In other embodiments, the sensors 130 may be substantially the same in terms of technology, but differ in terms of functionality. For example, all of the sensors 130 may be bending mode sensors produced by a particular manufacturer, with some of these sensors implemented to detect bending waves and other sensors implemented to detect plate deflection. In some embodiments, one or more of the sensors 130 may be a sensor other than a bending mode sensor.

In accordance with another embodiment, one or more of the sensors 130 can be used as an emitter device to emit a signal that can be sensed by the other sensors 130 to be used as a reference signal or to create vibrations that can be altered under a touch input, such altered vibrations being sensed by the sensors 130 to determine the position of the touch. An electrodynamic transducer may be used as a suitable emitter device. Moreover, one or more of the sensors 130 can be configured as a dual purpose sense and excitation transducer, for example as disclosed in previously incorporated U.S. Pat. Nos. 6,922,642 and 7,157,649, as well as in co-assigned U.S. Pat. No. 7,411,584 (Hill), which is fully incorporated herein by reference into this document.

Many applications that employ touch sensitive devices 100 also use electronic displays to display information through the touch sensitive devices 100. Such displays include, for example, liquid crystal displays, plasma displays, and organic light emitting diode displays. Since displays are typically rectangular, it is typical and convenient to use rectangular touch sensitive devices 100. As such, the touch substrate 120 to which the sensors 130 are affixed is typically rectangular in shape, it being understood that other geometries may be desirable.

According to one configuration, the vibration sensors 130A, 130B, 130C, 130D are preferably placed near the corners of the substrate 120. Because many applications call for a display to be viewed through the touch sensitive devices 100, it is sometimes desirable to place sensor 130A-D near the edges of the touch substrate 120 so that they do not undesirably encroach on the viewable display area. Placement of the vibration sensors 130A-D at the corners of a touch substrate 120 can also reduce the influence of acoustic reflections from the substrate edges.

The contact sensed by the touch sensitive device 100 may be in the form of a touch from a stylus, which may be in the form of a hand-held pen. The movement of a stylus on the touch substrate 120 may generate a continuous signal, which is affected by the location, pressure and speed of the stylus on the touch substrate 120. The stylus may have a flexible tip, for example of rubber, which generates bending waves in substrate 120 by applying a variable force thereto. The variable force may be provided by the tip, which alternatively adheres to or slips across a surface of the substrate 120. Alternatively, the contact may be in the form of a touch from a finger that may generate bending waves in the touch substrate 120, which may be detected by passive and/or active sensing. The bending waves may have frequency components in the ultrasonic region (>20 kHz).

The touch sensitive device 100 shown in FIG. 2 is communicatively coupled to a controller 150. The vibration sensors 130A-D are communicatively coupled to the controller 150 via conductors (for example, wires) or a printed electrode pattern developed on the touch substrate 120. The controller 150 typically includes front end electronics that measure signals or signal changes from the sensors on the vibration sensors 130A-D. The electronics in one embodiment could include an ASIC or a general purpose microprocessor. In one embodiment, controller 150 applies signals to the sensors on the sensor boards 130A-D. In other configurations, the controller 150 may further include a microprocessor in addition to front end electronics. The controller 150, as is described in detail below, is capable of implementing one or more touch location detection techniques selected from a library of disparate touch location detection techniques, as is described, for example, in US Patent Application Publication No. 2006/0244732, "Touch Location Determination using Bending Mode Sensors and Multiple Detection Techniques" (Geaghan).

In a typical deployment configuration, the touch sensitive device 100 is used in combination with a display of a host computing system (not shown) to provide for visual and tactile interaction between a user and the host computing system. The host computing system may include a communications interface, such as a network interface, to facilitate communications between a touch panel system that incorporates touch sensitive device 100 and a remote system. Various touch panel system diagnostics, calibration, and maintenance routines, for example, may be implemented by cooperative communication between the touch panel system and the remote system.

In vibration sensing touch input devices that include piezoelectric sensors, for example, vibrations propagating in the plane of the touch panel plate stress the piezoelectric sensors, causing a detectable voltage across the sensor. The signal received can be caused by a vibration resulting directly from the impact of a direct touch input or the input of energy due to a trace (friction), or by a touch input influencing an existing vibration, for example by attenuation of the vibration. The signal received can also be caused by an unintended input, such as an input resulting from user handling or mishandling of the touch input device, or from environmental sources external to, but sensed by, the touch input device.

Substrate 120 used in touch-sensitive devices employing bending wave technology may have thickness variations within a sheet exceeding 0.05 mm (and in some cases up to and exceeding 0.13 mm). Since many bending-wave-type touch-sensing algorithms assume constant thickness of the substrate, variations in substrate thickness may cause accuracy errors and missed touches. This is because bending waves move through the substrate at a speed related to the thickness of the medium. Therefore, varying thickness causes the bending waves to travel at different speeds, which may result in less accuracy in determining touch location on the sensor. These differing speeds may be algorithmically corrected using methods described, for example, in U.S. patent application Ser. No. 12/501,670, "Systems and Methods for Correction of Variations in Speed of Signal Propagation Through a Touch Contact Surface" (St. Pierre).

Figure 3:
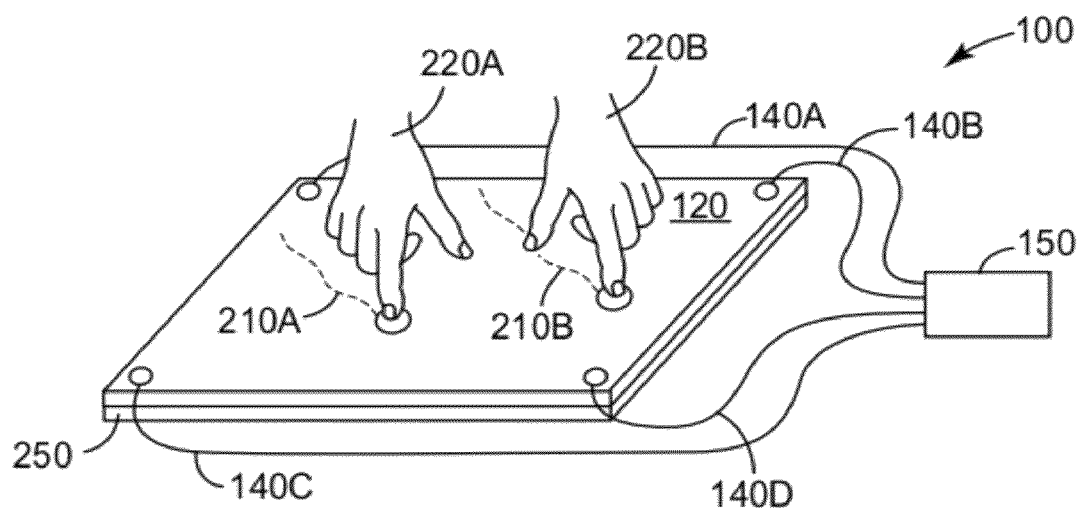
FIG. 3 is an illustration of a touch sensitive device detecting traces made by two fingers on the device.

Turning now to FIG. 3, there is illustrated the touch sensitive device 100 described with respect to FIG. 2, but additionally showing pointing objects 220A and 220B, which in this illustration are index fingers from a user's hands. Pointing objects 220A and 220B could be a styli (active or passive), pen, or anything that produces bending waves when dragged across the surface of substrate 120, or any combination of such things. Traces 210A and 210B show the paths by which the pointing objects have been dragged across the surface of substrate 120. At least part of either dragging event occurred while the other drag event was occurring (thus the traces are, at least partially, temporally overlapping). Touch sensitive device 100 in FIG. 3 is shown overlaying display device 250, which may be a liquid crystal display (LCD), plasma, cathode-ray tube (CRT), organic light emitting diode (OLED), or some other type display. The constituent coordinates of traces made by the dragging paths of pointing objects 220A and 220B may be reported by controller 150 to a computing device (not shown) to which the controller 150 is communicatively coupled. Computing device may then be communicatively coupled to display device 250. Visual indicia of the traces may then be displayed, in whole or in part, upon display device 250 in the form of a line following the path of the pointing object dragged across the screen, or as an object manipulated by finger drag motions.

While two pointing objects 220A and 220B are shown making temporally overlapping traces upon the surface touch sensitive device 100, the techniques disclosed herein may be used to detect and resolve constituent coordinates of traces made by dragging three or more pointing objects across the surface of touch sensitive device 100 (N-traces). Embodiments that can successfully resolve N-traces, where N is greater than 2, may employ more than four sensors 130, possibly five, six, seven, eight, or even more.

Figure 4:
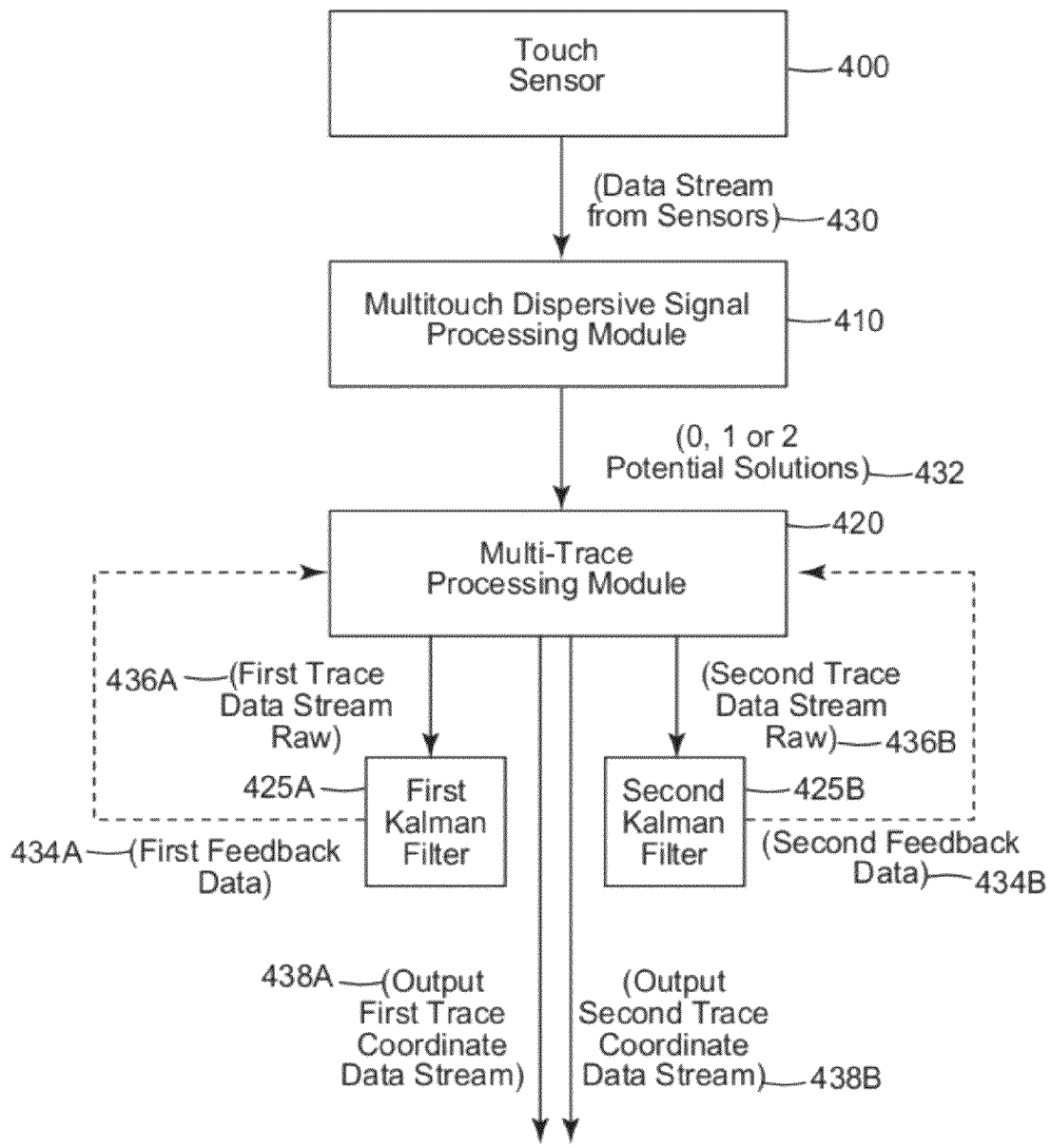
FIG. 4 is a schematic block diagram of a process used to determine coordinates of multiple temporally overlapping traces.

Turning now to FIG. 4, there is illustrated a flowchart showing a process used to resolve multiple temporally overlapping traces. As mentioned, it is possible to use this technique to resolve more than two temporally overlapping traces, but for the purpose of explaining the process, two temporally overlapping traces will be resolved.

Touch sensors (400) provide a data stream of signals (405) indicative of bending waves propagating through a substrate. This data stream is provided to a multi-touch dispersive signal processing module (410), which carries out steps 1 through 5 as described with respect to FIG. 1. Rather than provide the single top ranked solution (also referred to as candidate coordinate), however, multi-touch dispersive signal processing module provides coordinates of the two top scoring solutions that are above a specified threshold (432). These coordinates are provided to multi-trace processing module (420). Two traces are determined to be occurring if the distance between the solutions exceeds a threshold value. The multi-trace processing module, having determined two trace events are occurring, initializes a predictive filter for either trace (first and second Kalman filters 425A and 425B). Though described with respect to Kalman filters, in practice many different types of predictive filters could be used rather than the Kalman filter (for example, Weiner filters, particle filters, Hidden Markov Filters, or other stochastic estimation filters). More detail on how the Kalman filters are used is provided below. Multi-trace processing module determines which trace event the incoming solution should be associated with by calculating the distance squared between each solution and the next predicted coordinate for each trace, using the Kalman filter (this is discussed in more detail below), then associating the solution closest to the predicted location to that predicted location's trace (the other solution is automatically associated with the other trace event). Once the solution is associated with either the first or the second trace events, the solution is tested (or validated) using the associated predictive filter. This testing process uses the predictive filter to determine whether the solution is consistent with the velocity and direction of the other constituent coordinates of the trace event. This testing, or validation, process is described in more detail below. The testing process produces feedback (434A and 434B) indicative of whether the point is valid or not. If the solution is not invalid, it is deemed by multi-trace processing module to be a constituent coordinate of the respective trace, and output accordingly (438A and 438B). This process repeats, thus producing a stream of coordinates that comprise the traces.

If one of the trace events stops while the other continues (i.e., one of the two pointing objects being dragged across the surface of the touch sensitive device is lifted while the other continues), the potential solutions (432) provided to multi-trace processing module will provide one solution, which continues to be associated with the trace. If for some reason two solutions are provided, one of them being the result of noise, the predictive filter will likely eliminate the erroneous solution after determining it to be not valid.

A tap event may occur while a trace event is occurring. Tap events cause signals large enough to trigger a processing mode that adds a sixth "impulse reconstruction" step to the above outlined process. In the impulse reconstruction step, the four input signals are back-propagated to the touch point using a time reversal process that takes into account the dispersive effects of the bending waves. If the touch point is accurate, the back-propagated signals from all four input channels should approximately be the same. This process is more fully described in US Pat. App. Pub. No. 2005/0146511 (Hill, Sullivan), which is incorporated by reference in its entirety. In one embodiment, when a tap is detected during a trace event, the tap solution is provided as the starting point to one of the Kalman filters that are not currently tracking a valid trace. If both Kalman filters are tracking valid traces, one of the traces is terminated to allow for the tap solution to be used.

As mentioned above, a predictive filter, particularly a Kalman filter, is used by the multi-trace processing module to determine the validity of solutions (a solution being a pair of coordinates (X,Y) that define a position on a touch sensitive surface). A Kalman filter is a recursive filter that estimates the state of a system in the presence of noise. It attempts to do this in an optimal way, and is used to remove the effects of noise from measurements. In the processes which utilize it, described above, the Kalman filter helps to remove jitter present in the raw solutions, resulting in a smooth trace output.

One way to use a Kalman filter in the context of embodiments disclosed herein is as follows. Let the system state be represented by x and y coordinates of a point in a trace, and the velocities $v_x$ and $v_y$ in the x and y coordinates. Hence, the process model used for a Kalman filter would be:

$$S_k = AS_{k-1}, \text{ where } S = \begin{bmatrix} x \\ v_x \\ y \\ v_y \end{bmatrix} \text{ and } A = \begin{bmatrix} 1 & \Delta t & 0 & 0 \\ 0 & 1 & 0 & 0 \\ 0 & 0 & 1 & \Delta t \\ 0 & 0 & 0 & 1 \end{bmatrix}$$

The exemplary measurement model would then be:

$$M_k = HS_k, \text{ where } M = \begin{bmatrix} x^P \\ y^P \end{bmatrix} \text{ and } H = \begin{bmatrix} 1 & 0 & 0 & 0 \\ 0 & 0 & 1 & 0 \end{bmatrix}$$

Here, $(x^P, y^P)$ is a predicted point generated by the Kalman filter.

Figure 5:
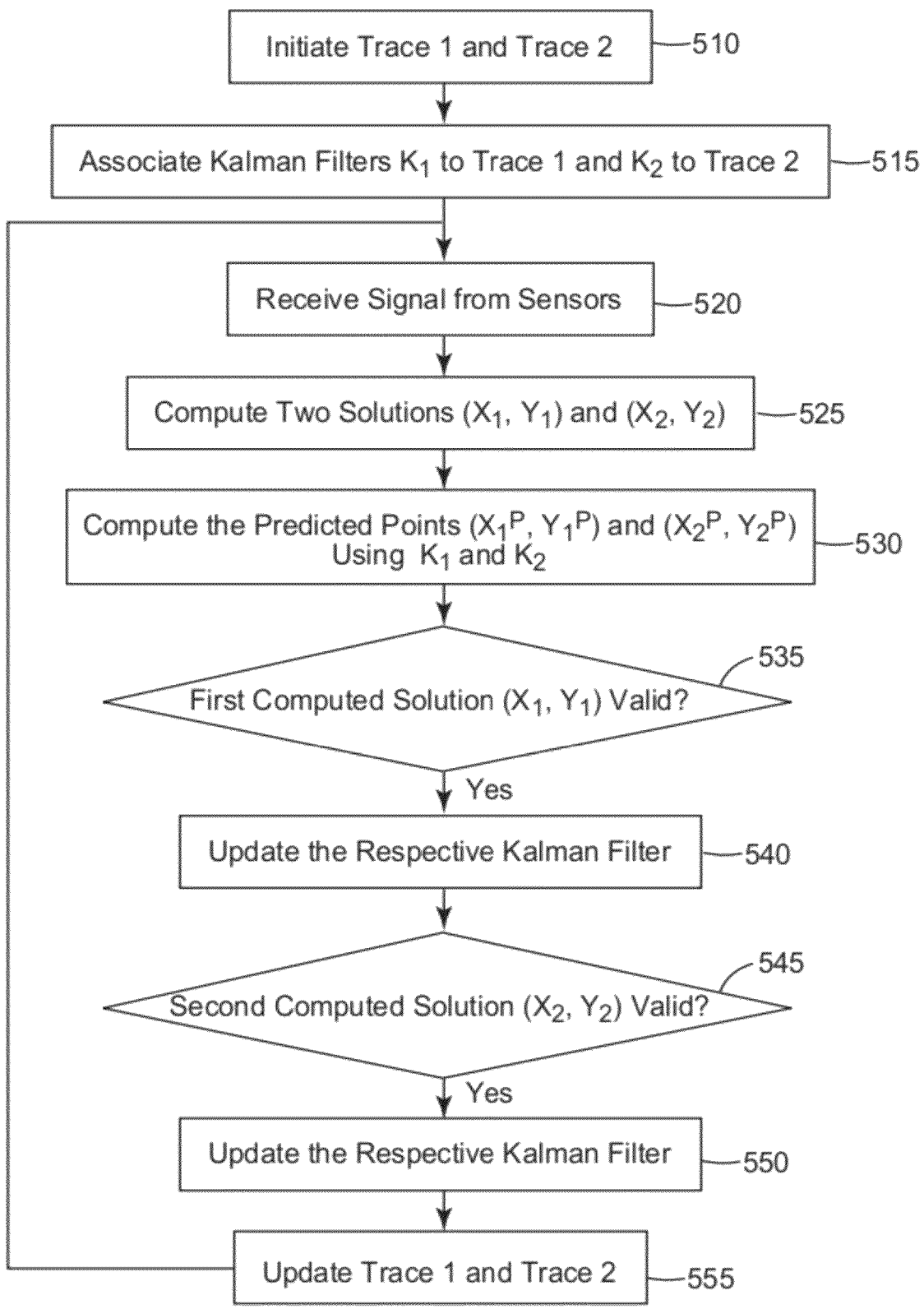
FIG. 5 is a flowchart illustrating process steps for determining constituent coordinates of multiple traces.

Turning now to FIG. 5, there is a flowchart illustrating the exemplary process steps to resolve two temporary overlapping traces. This flowchart is similar to the flowchart shown in FIG. 4, but shows the process steps rather than exemplary operational modules. These process steps may be extended to resolve more than two temporary overlapping traces. Signals received from sensors result in two solutions (($x_1$, $y_1$) and ($x_2$, $y_2$)), which are interpreted to mean two trace events are occurring. Thus trace 1 and trace 2 are initialized (step 510). A Kalman filter $K_1$ is associated with trace 1 and a Kalman filter $K_2$ is associated with trace 2 (step 515). With the two traces initialized, and corresponding Kalman filters established, the iterative portion of the process begins. Signals from sensors are again received (step 520), and two solutions ($x_1$, $y_1$) and ($x_2$, $y_2$) computed (step 525). If there are two solutions, then $K_1$ and $K_2$ are used to generate two predicted points (($x_1^P$, $y_1^P$) and ($x_2^P$, $y_2^P$) respectively) for trace 1 and trace 2 (step 530). These predicted points are calculated using standard Kalman filter equations. The predicted points are, for each trace, the next respective coordinate the trace would be expected to extend to, or, in other words, it is the next point the trace is expected to go to given the trace's direction and velocity. The distances between the solutions and the predicted points is then calculated, and the solution nearest a predicted point is associated with that predicted point's trace. In one embodiment, if there are two solutions, the other solution is automatically assigned to the other trace. The first solution ($x_1$, $y_1$) is validated. In one embodiment, a validation scheme starts with calculating the distance squared between the location predicted by the Kalman filter and each solution, as follows:

$$d_{i,j} = (x_i - x_j^P)^2 + (y_i - y_j^P)2^2$$

Then, the solution is confirmed to be included within a set of points that are within a pre-pre-defined distance of ($x_1^P$, $y_1^P$) or ($x_2^P$, $y_2^P$). In other words, the solution must be within a some pre-defined area adjacent to the predicted point (step 535). In some embodiments, the pre-defined area is dynamically adjusted given the speed and/or velocity of the trace. Other validation schemes will come to mind of those of skill in the art.

In one embodiment, "roughness" is also calculated and used to validate the solution. Roughness is a measure of how likely the data point matches the Kalman filter and is defined as:

$$r = \frac{d_{i,j}}{S}$$

where S is the statistical covariance of d. Thus when the Kalman filter analysis suggests uncertainty (covariance is high) more variation in solutions will be tolerated. Alternatively, when the Kalman filter is tracking a good signal (covariance is low) it is much more selective about what points it accepts. In one embodiment, this roughness value is used to determine whether a solution is valid or not by comparing it to a predetermined threshold value.

If the first solution ($x_1$, $y_1$) is valid, it is used to update the respective Kalman filter (step 540).

Other validation schemes are also possible. For example, validation could be accomplished by comparing the solution to a plurality of coordinates predicted given the direction and velocity of the trace. This could be done using predictive filters, similar to that which was described above. But predictive filters are not the only way to get a sense of where the trace is headed. Alternatively, for example, one could use a set of coordinates that define an area extending from the last coordinate of the trace and in the direction of that trace, and then compare the solution to this set of coordinates for validation. Additionally, it is not necessary to validate after the solution has been associated with the trace. For example, validation could occur before associating the solution with a trace by confirming the distance between a solution and the last coordinate of the trace is below some threshold value (for example, under 1 mm). Some of these validation schemes may in some embodiments produce less smooth trace, but additional post-trace coordinate calculations could be used to smooth the trace using known statistical methods.

The updated Kalman filter is then used to compute the next predicted point. If the second solution ($x_2$, $y_2$) is available, it is also similarly validated against ($x_1^P$, $y_1^P$) or ($x_2^P$, $y_2^P$) (step 545). If the second solution ($x_2$, $y_2$) is valid, it is used to update the other Kalman filter (step 550). If the second solution is not available, however, process steps 545 and 550 are skipped. Finally, trace 1 and trace 2 are updated by ($x_1^P$, $y_1^P$) and ($x_2^P$, $y_2^P$) (step 555). As mentioned above, the use of the Kalman filter in some embodiments results in smoothing the data, by discarding solutions that are contrary to its predictions. Alternatively, or additionally, further steps could be taken to smooth the trace. Process steps 520 to 555 repeat and produce a series of coordinates that comprise trace 1 and trace 2.

In some embodiments the Kalman filter may be, at times within a trace event, reset. This is done when the predicted covariance (computed along with the predicted solution, mentioned above in regard to step 530 in FIG. 5, as well as innovation covariance—all standard Kalman filter equations) exceeds a set threshold. If the covariance is above the threshold, the filter is reset and the prediction step (again, step 530), repeated. This reset procedure is done to prevent the filter from continuing to follow bad data. When the predicted covariance is high, it means there is significant uncertainty in the results.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A touch sensitive device comprising:
   a substrate capable of supporting bending waves having a first surface, a portion of the first surface defining a touch sensitive area;
   a plurality of sensors coupled to the touch sensitive surface and configured to (a) sense bending waves propagating through the substrate and generated by dragging one or more objects across the first surface, and (b) provide electronic signals representative of the bending waves; and,
   electronics communicatively coupled to the plurality of sensors and configured to:
      receive the electronic signals from the sensors; and
      determine based on the electronic signals whether the bending waves are generated by temporally overlapping first and second traces, the first trace defined by a first object dragged across a first portion of the first surface and the second trace defined by a second object dragged across a second portion of the first surface;
   the electronics being further configured to:
      determine first and second candidate coordinates defining possible positions of the first and second objects at a point in time;
      assign first and second predictive filters to the first and second traces;
      predict locations of the first and second traces from the predictive filters; and
      assign the candidate coordinates to the first and second traces based on the predicted locations of the first and second traces; and
      calculate constituent coordinates of the first and second traces based on the assigned candidate coordinates.

2. The touch sensitive device of claim 1, further comprising:
   an electronic display panel coupled to the substrate, and wherein the substrate is transparent and overlaid upon the display such to define a touch sensitive display.

3. The touch sensitive device of claim 1, wherein the sensors are piezoelectric transducers.

4. The touch sensitive device of claim 1, wherein at least one of the first or second objects is a finger.

5. The touch sensitive device of claim 1, wherein at least one of the first or second objects is a stylus.

6. The touch sensitive device of claim 1, wherein the substrate is glass.

7. The touch sensitive device of claim 1, wherein the electronics are further communicatively coupled to a computer system, and the electronics are further configured to provide signals indicative of the constituent coordinates of the traces to the computer system.

8. The touch sensitive device of claim 1, wherein the electronics is further configured to validate the candidate coordinates via the predictive filters and assign the validated candidate coordinates to be the constituent coordinates of the respective first or second traces.

9. The touch sensitive device of claim 8, wherein the electronics is further configured to provide signals indicative of the constituent coordinates of the first and second traces to a computer.

10. The touch sensitive device of claim 1, wherein the electronics is configured to calculate the candidate coordinates using the electronic signals received from the sensors, and wherein the electronics is further configured to validate the candidate coordinates via the predictive filters, and to calculate the constituent coordinates using the validated candidate coordinates.

11. The touch sensitive device of claim 10, wherein validating the candidate coordinates comprises determining whether the candidate coordinate is reasonable given the velocity and direction of the trace.

12. The touch sensitive device of claim 10, wherein validating the candidate coordinates comprises using the predictive filters to determine allowable next constituent coordinates of the traces, then comparing the candidate coordinate coordinates to the allowable next coordinates, and validating at least one of the candidate coordinates if there is a match.

13. The touch sensitive device of claim 12, wherein the predictive filters are Kalman filters.

14. The touch sensitive device of claim 12, wherein the validated candidate coordinate becomes a constituent coordinate of the trace to which it is determined to be an allowable next coordinate.

15. The touch sensitive device of claim 12, wherein the validated candidate coordinate becomes a constituent coordinate of the trace to which it is closest.

16. The touch sensitive device of claim 1, wherein assigning the candidate coordinates to the traces comprises associating the candidate coordinates based on respective distances between the candidate coordinates and the predicted locations.

17. A method for resolving constituent coordinates of a plurality of trace events made by dragging objects across the touch sensitive surface of a touch sensitive substrate in a temporally overlapping manner, the plurality of trace events producing temporally overlapping trace-induced vibrations that propagate through the touch sensitive substrate, the method comprising:
   receiving from a plurality of sensors bending wave information from the temporally overlapping trace-induced vibrations;
   determining that the bending wave information is indicative of the plurality of temporally overlapping trace events;
   calculating from the bending wave information candidate coordinates representative of coordinates of trace objects corresponding to the plurality of trace events at points in time during the plurality of trace events;

predicting locations of the plurality of trace events using a plurality of predictive filters; and associating the candidate coordinates with the plurality of trace events based on the predicted locations.

18. The method of claim 17, wherein associating the candidate coordinates with the plurality of trace events comprises:
using the predictive filters to validate the candidate coordinates, and then associating valid candidate coordinates with particular ones of the plurality of trace events.

19. The method of claim 18, further comprising:
not associating invalid candidate coordinates with any of the plurality of trace events.

20. The method of claim 18, wherein associating the candidate coordinates with the plurality of trace events further comprises:
after validating the candidate coordinates, associating valid candidate coordinates with particular ones of the plurality of trace events to which the valid candidate coordinates are respectively closest to.

21. The method of claim 18, wherein the predictive filters are stochastic estimation filters.

22. The method of claim 21, wherein the stochastic estimation filters are Kalman filters.

23. The method of claim 18, further comprising:
providing information indicative of the plurality of trace events to a computer.

24. The method of claim 23, further comprising:
updating a display device communicatively coupled to the computer with information indicative of the plurality of trace events.

25. The method of claim 17, wherein associating the candidate coordinates with the plurality of trace events comprises associating the candidate coordinate with the plurality of trace events based on respective distances between the candidate coordinates and the predicted locations.

26. The method of claim 18, wherein associating the candidate coordinates with the plurality of trace events further comprises:
after validating the candidate coordinates, associating valid candidate coordinates with particular ones of the plurality of trace events to which the valid candidate coordinates are respectively closest to.

27. The method of claim 26, wherein validating the candidate coordinates comprises:
using the predictive filters to determine whether the candidate coordinates are consistent with a direction and velocity of any of the plurality of trace events.

28. The method of claim 26, wherein validating the candidate coordinates comprises:
determining whether a distance from a given candidate coordinate and a last known coordinate of one of the plurality of trace events exceeds a threshold value.

29. The method of claim 28, wherein the threshold value is particular to each of the plurality of trace events and is dynamically updated as a function of the velocity and direction of each of the plurality of trace events.

* * * * *

UNITED STATES PATENT AND TRADEMARK OFFICE
CERTIFICATE OF CORRECTION

PATENT NO. : 8,325,160 B2
APPLICATION NO. : 12/558096
DATED : December 4, 2012
INVENTOR(S) : Richard L St. Pierre It is certified that error appears in the above-identified patent and that said Letters Patent is hereby corrected as shown below:

In the Specifications:

Column 10,

Line 9, delete " $d_{i,j}=(x_i-x_j^p)^2+(y_i-y_j^p)2^2$ " and insert in place thereof -- $d_{i,j} = (x_i - x_j^p)^2 + (y_i - y_j^p)^2$ --.

Line 11, delete "pre-pre-defined" and insert in place thereof -- pre-defined --.

In the Claims:

Column 12,

Line 34, after "candidate" delete "coordinate".

Signed and Sealed this
Seventh Day of May, 2013

Teresa Stanek Rea
*Acting Director of the United States Patent and Trademark Office*